April 26, 1966    F. M. VRANKEN    3,248,517
GRAVITY BENDING FURNACE PARTICULARLY FOR
MANUFACTURING BENT GLASS SHEET Filed Jan. 21, 1963     4 Sheets-Sheet 1

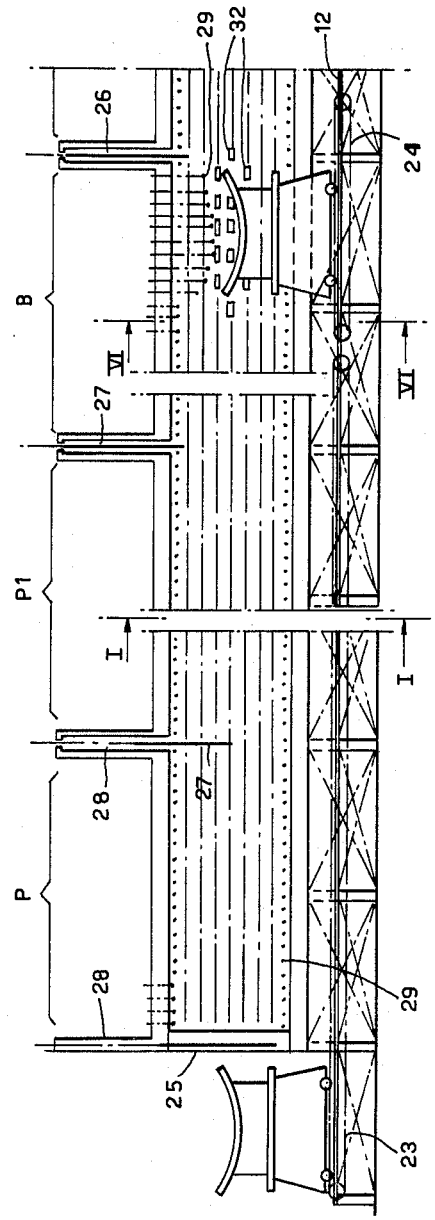
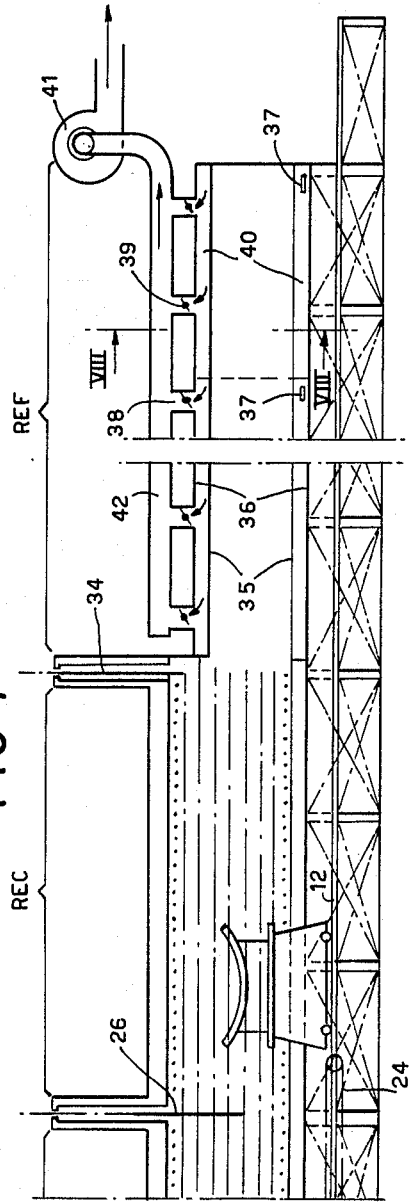

April 26, 1966  F. M. VRANKEN  3,248,517
GRAVITY BENDING FURNACE PARTICULARLY FOR
MANUFACTURING BENT GLASS SHEET
Filed Jan. 21, 1963  4 Sheets-Sheet 4
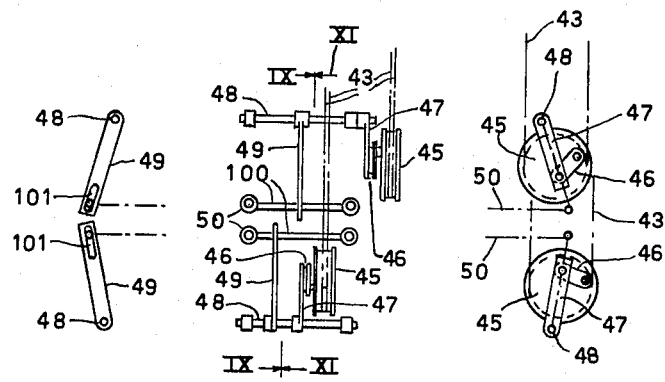
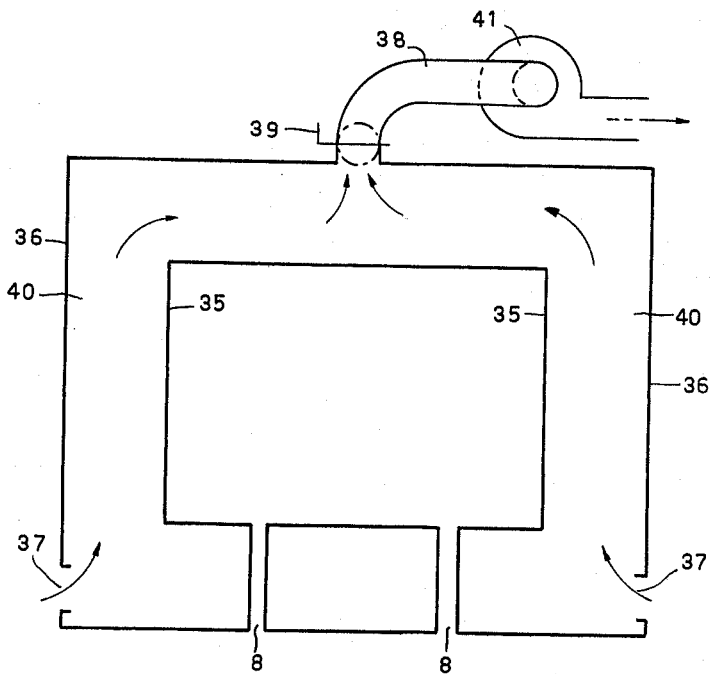

United States Patent Office 3,248,517
Patented Apr. 26, 1966

3,248,517
GRAVITY BENDING FURNACE PARTICULARLY FOR MANUFACTURING BENT GLASS SHEET
Felix Moise Vranken, Moustier-sur-Sambre, Belgium, assignor to Glaceries Reunies, Société Anonyme, Jemeppe-sur-Sambre, Belgium
Filed Jan. 21, 1963, Ser. No. 252,869
Claims priority, application Belgium, Jan. 26, 1962, 613,153
3 Claims. (Cl. 219—404)

This invention relates to a gravity bending furnace for bending together two glass sheets which are placed in contact one above another for manufacturing bent glass sheet sandwiches. The furnace according to a first object of the invention takes the form of a continuous tunnel furnace mainly comprising two parts, one for heating and being the glass sheets and the second serving as a lehr for annealing and gradually cooling the glass. There are provided four zones along the length of the furnace, namely:

(1) A preheating zone
(2) A bending zone
(3) An annealing zone
(4) An accelerated cooling zone It is a further object of the invention to provide improvements in a furnace of the above type to facilitate the heating and the bending of the glass sheets.

Various features of the furnace according to the invention will be decsribed hereinafter with respect to the accompanying drawings wherein:

FIG. 5 is a longitudinal sectional elevation view of the preheating zone and bending zone of the furnace;

FIG. 7 is a side elevation of the annealing and cooling zones;

FIG. 8 is a vertical transverse cross-section of the cooling zone taken along the line VI—VI in FIG. 5; and FIGS. 9-11 show details of the mechanism controlling movements of the resistors used in the bending zone.

Figure 1:
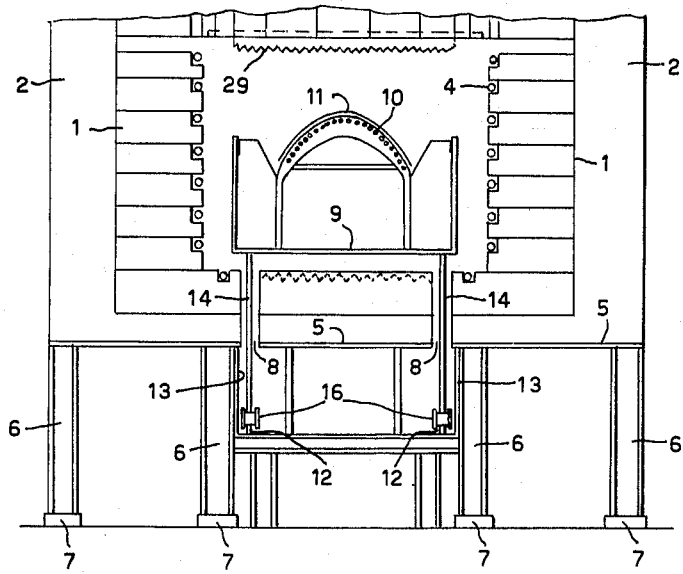
FIG. 1 is a diagrammatic vertical transverse sectional view of the furnace taken along the line I—I of FIG. 5.

A furnace of the kind specified comprises four zones:

(1) A preheating zone (P and $P_1$);
(2) A bending zone (B);
(3) An annealing zone (REC);
(4) A cooling zone (REF).

(A) *Preheating zone (P and $P_1$) and bending zone*

The enclosed space of the tunnel furnace is formed by an inner refractory brick lining 1 covered by an outer covering 2 of insulating bricks or insulating powder. The refractory lining is formed with recesses 3 adapted to receive electric heating resistors 4. This mass rests on a cast-iron plate 5 supported by metal framework 6 mounted on rollers 7 so that the furnace is free to expand. The bottom part or furnace hearth is formed with two parallel slots 8 for the movement of the carriage 9 supporting the bending mould 10—which can be of any kind—and the glass sheets 11 which it is required to bend. The carriage 9 runs on rails 12 forming a track. A thermally insulated sheet-metal box 13 surrounds the tracks 12 to prevent air from leaking into the furnace through the slots 8.

Figure 2:
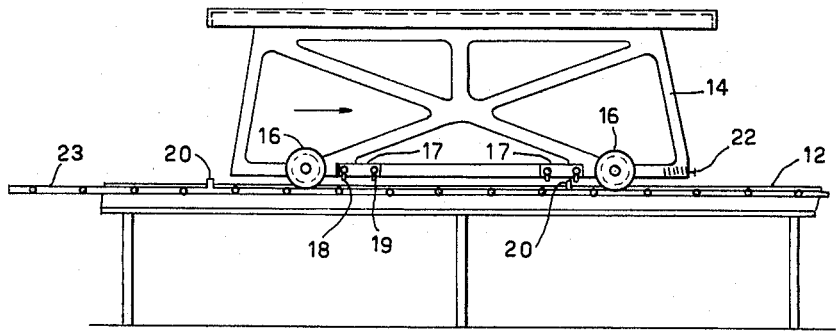
FIG. 2 is a side elevation of the carriage which carries the mould and the glass.
Figure 3:
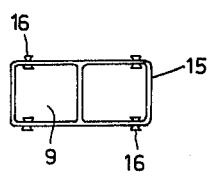
FIG. 3 is a plan view of the carriage.
Figure 4:
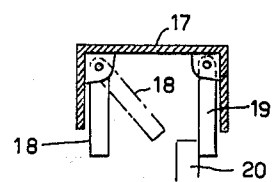
FIG. 4 illustrates in detail a portion of the carriage.
Figure 6A:
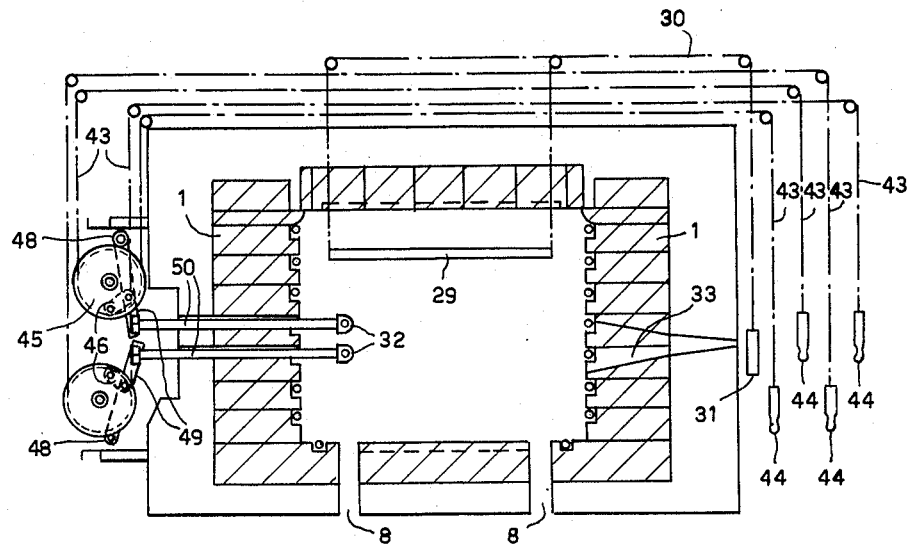
FIGS. 6A and 6B are transverse vertical cross-sections in the bending zone taken along the line IV—IV of FIG. 3.
Figure 6B:
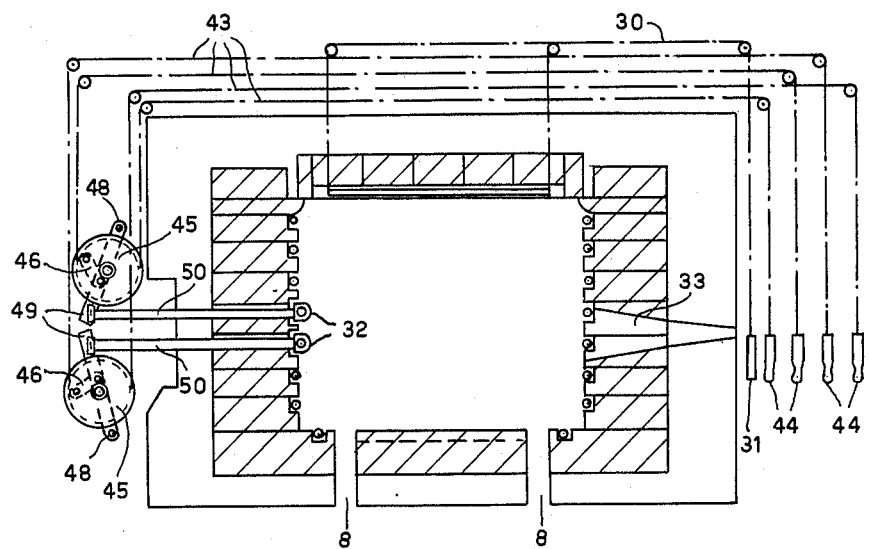

As can be seen in FIGS. 2 and 2A, the carriage 9 comprises two frames 14 assembled from flat members, preferably of stainless steel, interconnected at the top by crosspieces 15. The frames 14 have rollers 16 enabling the carriage 9 to run on the track 12. The carriage sides have boxes 17 (FIGS. 2 and 2B) comprising two pivoting fingers 18, 19 co-operating with studs 20 of the carriage-moving chains 23, 24. Resilient bumpers 22 are provided in the front of the carriage. Two driving chains extend over the distance travelled by the carriages through the furnace; one such chain 23, introduces the carriages into the furnace and advances the carriages as far as the bending zone, and the second chain 24, follows the first chain 23 and is used to transport the carriage through the bending, annealing and cooling zones (FIG. 3). At the end near the entry of the chain 23, the articulated finger 18 is pushed away into the position $18^1$ (FIG. 2B) by the stud 20, and the same engages with the finger 19 to drive the carriage. The same thing happens when the carriage passes from the chain 23 to the chain 24, and so there may be an interruption in carriage advance during this changeover between the conveyors.

Referring to FIG. 3, there can be seen the entry doors 25 and exit doors 26 and the doors 27 separating the two preheating zones P and $P_1$, and separating zone $P_1$ from the bending zone B. The doors 25–27, which are made of non-distorting materails, preferably cast-iron, slide in the furnace framework and when open are received in a sealing-tight pocket 28 which is of insulating bricks and which is disposed above the furnace.

A feature in the bedning zone is the relative position of the resistors in the furnace. There are lateral resistors 32 parallel with the furnace axis, and top and bottom horizontal resistors 29 which are perpendicular to the furnace axis and which are operated by drives comprising chains 30 and counterweights 31. The resistors 29 located at the arch of the furnace are movable vertically, while the lateral resistors 32 can be displaced horizontally. All the resistors can be removed. Because of this heating resistor arrangement, local heating can be provided for parts of glass sheets at places where curvature increases either lengthwise or transversely. Also, the resistors 29, 32 can be positioned in accordance with the required final curvature, as illustrated by way of example in FIG. 3 for the resistors 29. The lateral resistors are operated by slide rods, as will be described hereinafter. Observation holes 33 are provided for inspection of the curvature of the glass and the position of the variable resistors.

(B) *Annealing zone (REC) and cooling zone (REF)*

Beyond the gate 26 the tunnel is extended by the annealing zone (REC) which is of the same construction as the heating zones. Heating of the annealing zone is so controlled as to provide a gradual programmed reduction of the temperature such that, at the exit from the annealing zone, the two glass sheets which form a pair and which have been bent together, have been annealed satisfactorily. A gate 34 separates the annealing zone from the accelerated cooling zone. The entry of the cooling zone is heated only by a possible introduction of hot air from the annealing lehr. The accelerated cooling zone comprises a muffle box 35 surrounded by a sealing-tight sheet-metal sheath 36 forming an outer muffle in which air flows. Cool air is sucked in from the atmosphere through variable apertures 37 provided in the box 35 near the outlet end of the cooling zone. Air intakes 38 having control valves 39 are disposed along the box 36 and serve for removal of the cooling air flowing through the space 40. The cool air is moved by a fan 41 in a duct 42 in countercurrent—i.e., in a direction opposite to the direction of carriage advancement. The valves 39 and apertures 37 can be adjusted so that a temperature drop occurs along the length of the box. As a variant, the fan 41 can be reversed so that cool air is blown in through the duct 42 and removed through the apertures 37.

FIGS. 7, 8 and 9 illustrate by way of example apparatus for moving the lateral resistors.

Cables 43 having counterweights 44 run over pulleys 45 having a rod 46 driving a crank 47 rigidly secured to a shaft 48 supporting an arm 49 for driving a frame 50 to which is connected the resistor 32. As a counterweight 44 is lowered and raised the associated resistor 32 is laterally displaced in opposite directions.

What I claim is:

1. In a gravity bending furnace having the form of a continuous tunnel furnace wherein a sheet of glass is advanced along a longitudinal path through successive serially arranged treatment zones including a preheating zone, a bending zone, an annealing zone, and an eccelerated cooling zone, means in the bending zone for heating the glass sheet during bending thereof, said means including transversely extending resistors located above the path of the glass sheet, means supporting the resistors for vertical displacement, longitudinally extending resistors located laterally beyond the path of the sheet and means supporting the longitudinally extending resistors for lateral displacement towards and away from said path of the glass sheet, the latter said means including a frame for each resistor supported in said furnace for reciprocal sliding movement in a transverse direction, a pair of counterweights for each frame outside said furnace adapted for being raised and lowered relative to one another, and means connecting said pair of counterweights to the respective frame to displace the latter and the resistor therewith in a respective direction dependent upon the direction of displacement of the counterweights relative to one another.

2. In a furnace as claimed in claim 1 wherein said frame is a transverse member supporting a respective resistor.

3. In a furnace as claimed in claim 2 wherein said means connecting the pair of counterweights to each frame includes a cable having ends connected to the counterweights, a rotatable pulley around which passes the cable and which rotates as the cable is raised and lowered, a shaft coupled to said pulley for rotation therewith, a crank having one end connected to said shaft for undergoing pivotal movement as the shaft is rotated, said crank being connected to the associated frame to displace the same as the crank is pivotally moved.

References Cited by the Examiner

UNITED STATES PATENTS

| | | | |
|---|---|---|---|
| 1,733,582 | 10/1929 | Cox | 165—120 |
| 1,924,271 | 8/1933 | Chapman | 165—120 |
| 1,997,250 | 4/1935 | Eastwood | 219—388 |
| 2,056,207 | 10/1936 | Piazzoli | 219—35 |
| 2,340,354 | 2/1944 | Wells. | |
| 2,377,946 | 6/1945 | Leary. | |
| 2,583,764 | 1/1952 | Buckholdt | 198—88 |
| 2,620,918 | 12/1952 | Fallon | 198—218 |
| 2,820,131 | 1/1958 | Kodama | 219—404 X |
| 2,841,684 | 7/1958 | Miskella | 219—404 X |
| 2,967,378 | 1/1961 | Jones et al. | 65—107 |
| 3,001,328 | 9/1961 | Berseth | 219—388 X |
| 3,008,270 | 11/1961 | Hohmann et al. | 65—268 |
| 3,020,677 | 2/1962 | White | 65—287 |

ANTHONY BARTIS, *Acting Primary Examiner.*

RICHARD M. WOOD, *Examiner.*

R. F. STAUBLY, *Assistant Examiner.*